United States Patent [19]
Laing et al.

[11] 3,806,209
[45] Apr. 23, 1974

[54] BEARING STRUCTURE

[76] Inventors: Nikolaus Laing; Ingeborg Laing, both of Hofener Weg 35-37, 7141 Aldingen bei Stuttgart, Germany; Ludwig Ludin, Kesselackerweg, CH5611 Anglikon-Woheln, Switzerland

[22] Filed: June 19, 1973

[21] Appl. No.: 371,480

Related U.S. Application Data

[63] Continuation-in-part of Ser. No. 233,912, March 13, 1972.

[52] U.S. Cl. .................................................. 308/9
[51] Int. Cl. ............................................ F16c 17/16
[58] Field of Search ........................................ 308/9

[56] References Cited
UNITED STATES PATENTS
3,174,809   3/1965   Mackie .............................. 308/9

Primary Examiner—Charles J. Myhre
Assistant Examiner—Frank Susko

[57] ABSTRACT

A bearing assembly with two bearing elements forming a bearing clearance therebetween, of which one element is designed as a compliant bearing element confining partially a cavity and in which a pressure is maintained to press the compliant bearing element against the other bearing element.

14 Claims, 10 Drawing Figures

BEARING STRUCTURE

CROSS-REFERENCE TO OTHER APPLICATIONS

This application is a Continuation-in-Part of our co-pending application Ser. No. 233,912 filed Mar. 13, 1972.

THE PRIOR ART

Bearing assemblies utilizing surfaces of revolution as sliding surfaces between which a carrying film is maintained hydrostatically or hydrodynamically are becoming increasingly important because the best bearing performances can be achieved with this type of bearing structure. Such bearings hitherto have utilized inward leading grooves, i.e., so-called ring groove bearings, which, when lubricated with relatively high viscosity lubricants, for example, oil or grease, produced the necessary carrying film. There also exists a need to provide hydrodynamic bearings for use with lubricants of relatively low viscosity, as for example, water or a gas. Theoretically, every hydrodynamic bearing can be designed for every lubricant. In practice, there are fundamental difficulties facing the design of bearings using low viscosity lubricants because, with diminishing viscosity, the lubricating clearances, i.e., the distance between the sliding counterparts, also must diminish. In practice, the clearances become so small that the manufacture of such bearings becomes economically unjustifiable or else small temperature changes lead to such large dimensional changes that the clearances arising therefrom become much larger than the clearances required for the generation of a hydrodynamic carrying film.

The manufacture of water-lubricated bearings must take into account that the viscosity of water is smaller by a factor of 100, and in the case of hot water by a factor of 300, than the viscosity of oil. In water-lubricated bearings, clearances between the bearing elements are necessary in the order of $1-2\,\mu$. Such clearances can theoretically be achieved by high-grade finishing of the bearing elements but, in practice, the manufacturing cost is uneconomic. Furthermore, it has been found that such bearings, even when made with the highest precision, are difficult to use because the bearing elements heat up in operation and expand unequally thus varying the clearance between the elements. Even with small differences in expansion coefficients of the two bearing elements, bearing clearances result with widths between 10 and 100 $\mu$. The result has been that highly loaded water-lubricated bearings with rigid components are usable only if operated at a substantially constant temperature.

A spiral groove bearing assembly to support axial and radial loads is known where the assembly comprises convex and concave bearing elements and where the concave bearing element is in the form of a thin-walled shell. A constant clearance between the bearing elements of such an assembly can be maintained over a portion of the loaded surfaces with the help of the elasticity of the shell-shaped bearing element where the bearing assembly operates at a substantially constant temperature. However different dimensional changes caused by different expansion coefficients between the two bearing elements cannot be compensated for by the elastic compliance of the shell-shaped bearing element.

THE OBJECTS OF THE INVENTION

It is an object of the invention to provide a bearing assembly in which one bearing element automatically hugs the other bearing element so that under all operational conditions a predetermined clearance between the bearing elements is maintained notwithstanding varying manufacturing tolerances or different thermal expansions between the elements such that the assembly is applicable with use of lubricants of low viscosity under large bearing loads.

SUMMARY OF THE INVENTION

The present invention is directed to a compliant bearing element having a deformable load carrying surface of revolution which forms, at least partly, the boundary of a cavity on the side opposite to the side facing the bearing clearance and where a pressure is maintained in the cavity to press the deformable load carrying surface against the other bearing element. According to the invention, a pressure medium can be used, which is introduced into the cavity on the side of the elastically deformable bearing surface opposite the side facing the bearing clearance. The pressure medium is either subjected to the pressure prevailing at the center of a spiral groove bearing so that the cavity must communicate with the center or another point of the bearing clearance, or else the pressure medium is subject to pressure from an external pressurizing source communicating with the cavity, e.g. mains water used for lubrication of bearings for drainage water pumps where the bearings act as hydrostatic bearings. Another possibility for maintaining the pressure lies in inserting an elastomeric body in the cavity which presses the elastically deformable bearing surface of one bearing element against the other bearing element.

Bearings according to the invention can comprise bearing elements with arbitrary surfaces of revolution facing the bearing clearance and carrying the load. Such surfaces of revolution may comprise flat, cylindrical, spherical or conical surfaces. All these surfaces, when an elastic compliant surface is arranged as a boundary of a cavity in which a corresponding pressure is maintained, permit an elastic deformation which ensures the required narrow bearing clearance for the maintenance of the hydrodynamic wedge effect. It is unimportant whether the elastic compliant surface forms the concave or the convex bearing surface. A particularly simple arrangement can be obtained when the cavity on the side of the elastic compliant bearing surface opposite to the side facing the lubricating clearance, communicates with that zone in the lubricating clearance in which the pressure built up by the grooves of a grooved bearing has its maximum value.

The invention furthermore envisages that the surfaces of the sliding counterparts which are in contact during start-up comprise materials having good wear-resistant properties and good sliding properties so that during start-up and before the lubricating film has been formed, the materials do not weld together or score. Electroplated layers of gold or a platinum metal or of a corrosion resistant non-precious metal have been found particularly suitable, into which are embedded powders of very hard materials, preferably tungston carbide, silicon carbide, titanium carbide or boron carbide, while in the plating bath.

DESCRIPTION OF THE DRAWINGS

The invention will be explained by way of example with the help of figures.

FIG. 1a is a plan view of a rotor in the arrangement according to FIG. 1 along the section lines 1a — 1a;

DETAILED DESCRIPTION OF THE PREFERRED EMBODIMENTS

Figure 1:
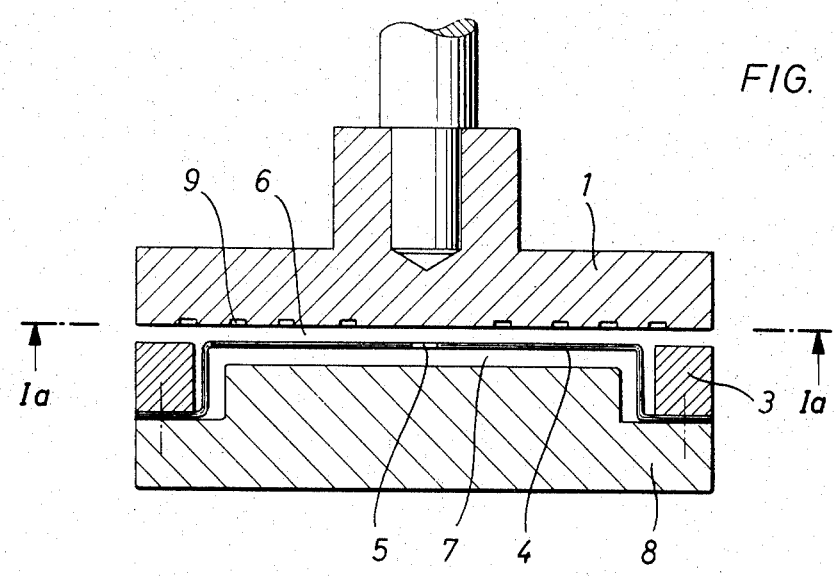
FIG. 1 illustrates diagrammatically a cross-section through a bearing assembly according to the invention having flat surfaces.
Figure 1A:
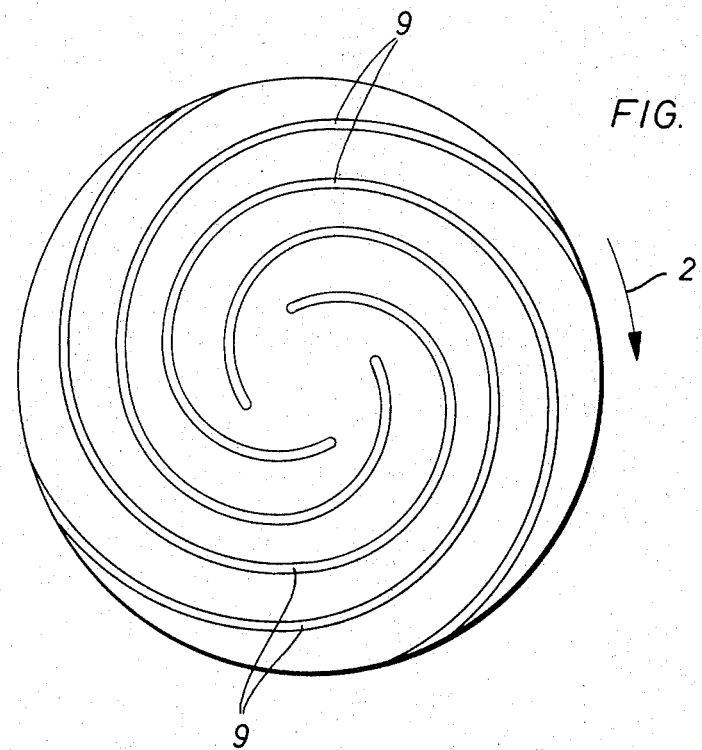

FIG. 1 shows diagrammatically in cross-section an axial bearing assembly with flat sliding surfaces of revolution. Spiral grooves 9 are in the first bearing element or rotor 1 which is supported by a second bearing element or stator 8. A ring 3 supports the static load when the bearing assembly is not in operation and comprises a material with good sliding properties. The ring 3 furthermore presses an elastic compliant membrane type deformable surface against the stator 8. The membrane 4 forms a hydrodynamic lubricating clearance 6 with the rotor 1. Lubricant is pressed via the aperture 5, which serves as a pressure transmitting means into the cavity 7 when the rotor 1 turns in the direction 2 (FIG. 1a). The membrane 4 is thereby pressed against the rotor 1. The grooves 9 can also be made in the membrane 4 instead of the rotor 1. Equally, the elements 3, 4 and 8 can be made rotating.

Figure 2:
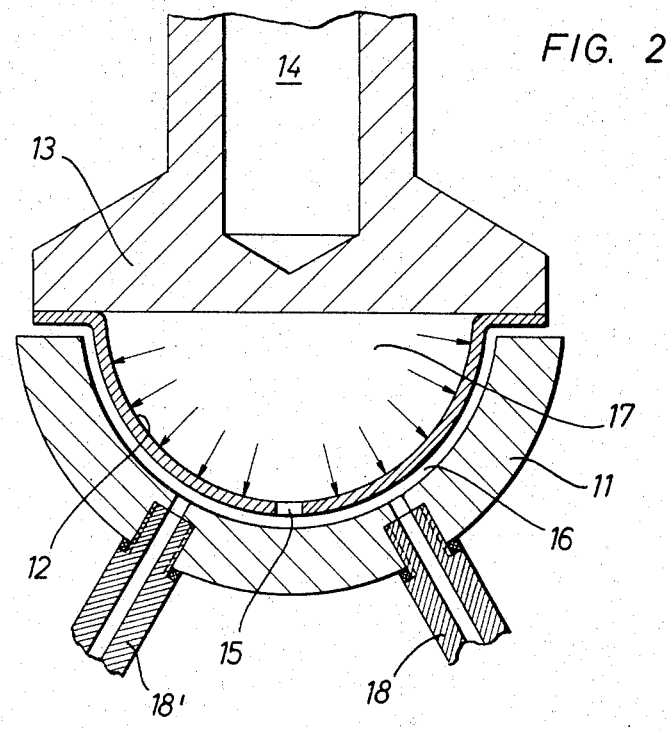
FIG. 2 illustrates diagrammatically a cross-section of a bearing having spherical sliding surfaces.

FIG. 2 diagrammatically illustrates a bearing assembly having a concave bearing element 11 and a convex bearing element 12 formed as an elastic compliant bearing element with a deformable surface of revolution which is mounted in a holder 13 and which contains a shaft bore 14. A pressure fluid, e.g. water under pressure, is led through the two conduits 18 and 18' into the clearance 16 formed between the deformable surface and the concave element 11, through the aperture 15 contained in the deformable surface and on into the cavity 17 where the pressure will then extend the deformable surface towards the element 11. In this form of the invention the bearing acts as a hydrostatic bearing. Either the deformable surface facing the concave element 11 or the concave surface of element 11 could be spirally grooved in the manner shown in FIGS. 1 and 1a where the grooves would extend from the periphery of the surfaces to the pole region adjacent aperture 15. In operation of the assembly, pressure of fluid in the grooves would increase towards the pole region and be transmitted through the aperture 15 into the cavity. In this form, the bearing would act as a hydrodynamic bearing.

Figure 3:
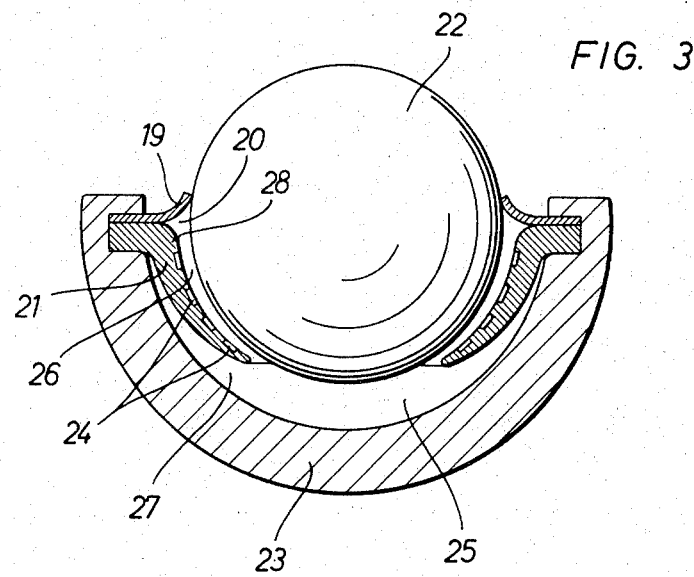
FIG. 3 illustrates diagrammatically a cross-section of a different embodiment of a bearing assembly also having spherical sliding surfaces.

FIG. 3 shows diagrammatically an arrangement in which the convex bearing element is formed as a sphere 22 while the concave element is formed as an elastic compliant bearing surface comprising a deformable ring 21. Spiral grooves 24 are arranged in ring 21 to generate a high pressure in the pole region 25. The ring 21 is surrounded by a shell 23 so that the lubricant can enter the cavity 27. A land 28 is arranged on the inner circumference of the bearing ring 21 and forms in part a ring channel 20 through which all spiral grooves 24 communicate with each other. A bezel 19 prevents the ingress of dirt particles into the channel and, to a large extent, fluid exchange so that fluid once trapped in the bearing cavity remains permanently as a lubricant. In this manner, precipitation of solids as, for example, chalk, is avoided. The concave bearing ring 21 is pressed against the sphere 22 by the pressure generated in the pole region 25. The cross-section of the bearing ring decreases from the radial outer portion thereof towards the center whereby a constant clearance 26 is assured because between the sphere 22 and the bearing part 21, namely, in the bearing clearance 26, a pressure prevails which diminishes toward the channel 20 while the pressure in the clearance 27 remains constant.

Figure 4:
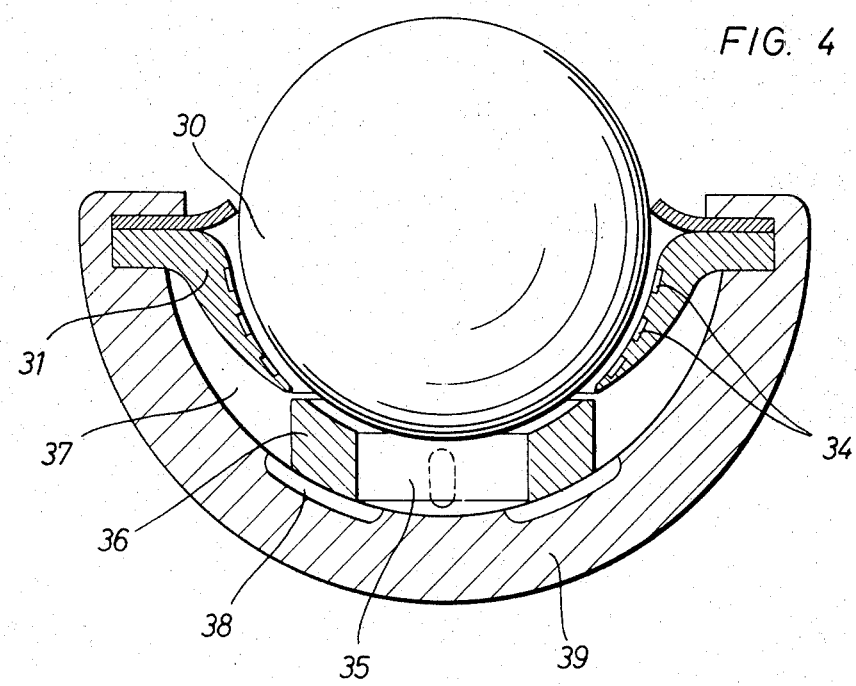
FIG. 4 illustrates diagrammatically a cross-section of a bearing illustrating a still further embodiment utilizing spherical sliding surfaces.

FIG. 4 shows diagrammatically a similar arrangement as FIG. 3. A concave bearing element 39 has a deformable surface 31 formed as an elastic compliant bearing surface which advantageously comprises a PTFE material and serves to generate a flow by means of spiral grooves 34 which generate a high pressure in the pole region 35. In contrast with the embodiment according to FIG. 3, this form of the invention includes a ring 36 of a hard material, e.g. a carbide, oxide or nitride located in the pole region to support the sphere 30 so long as the bearing has not yet gathered an adequate rotational speed so as to form a supporting film of lubricant. Channels 38 in the bearing part 39 establish the hydraulic connection between the clearance region 37 and the pole region 35.

Figure 5:
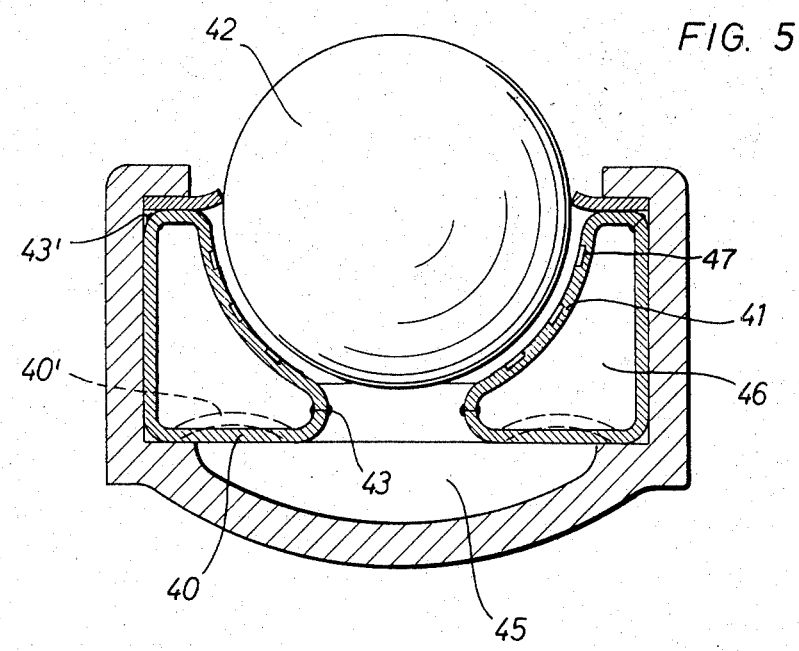
FIG. 5 illustrates diagrammatically a cross-section of a bearing having spherical sliding surfaces and utilizing an incompressable material for exerting pressure on a deformable surface.

FIG. 5 shows diagrammatically an arrangement in which the concave bearing ring formed as a compliant bearing surface comprises a ring wall 41, which, together with the ring wall 40, is welded along the welding seams 43 and 43' into a hollow ring, the inside 46 of which is filled with an incompressible material, preferably a highly viscous liquid. Spiral grooves 47 are included on wall 41 to generate a pressure of the lubricant in the cavity 45 which leads to a deformation of the ring region 40 into the position 40'. Movement of wall 40 acts as a pressure transmitting means whereby the concave wall 41 is pressed hydrostatically against the surface of the sphere 42.

Figure 6:
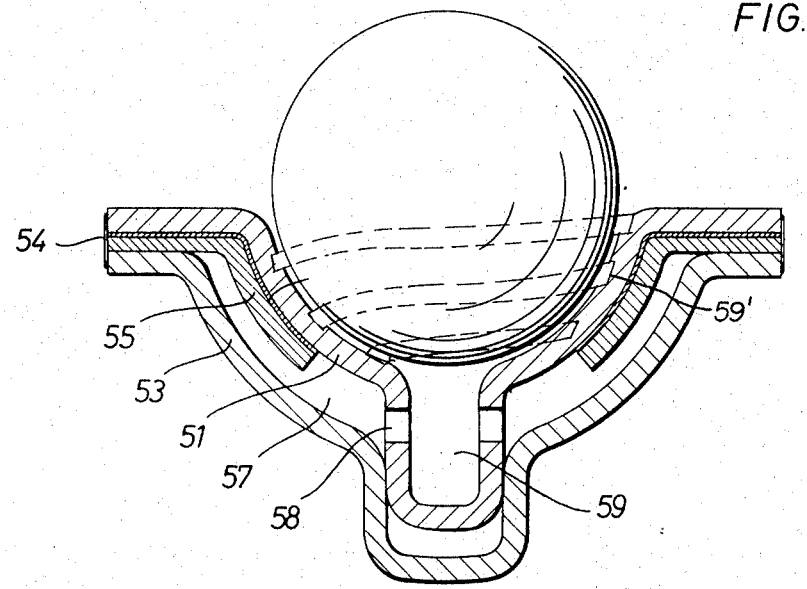
FIG. 6 illustrates diagrammatically a cross-section of a further embodiment of the invention using spherical sliding surfaces.

FIG. 6 shows diagrammatically an embodiment in which a concave bearing element comprises a deformable ring 51 providing a deformable surface which is inserted into a ring 53 and welded together at the periphery 54. In order to achieve as uniform deformation as possible, a further ring 55 is included between rings 51 and 53 and prevents, by means of a seal 56, the ingress of fluid from the cavity 57 into the clearance between parts 51 and 55. The space 59 communicates with the space 57 via channels 58. Spiral grooves 59' are provided on the ring 51 to generate the hydrodynamic pressure of the lubricant needed to deform the deformable surface.

Figure 7:
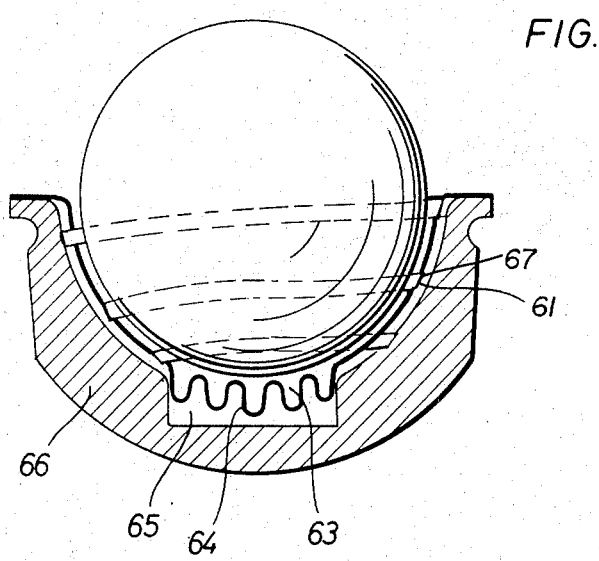
FIG. 7 illustrates diagramatically a cross-section of a further embodiment of the invention utilizing an incompressable material for urging a deformable surface into contact with a bearing surface.

FIG. 7 shows diagrammatically an embodiment in which a concave bearing element 66 has a deformable surface 61 which springs back in a pole region 63. The surface 61 is formed at the pole region as a corrugated membrane 64 so that hydrodynamic pressure built up in the pole region 63 between the bearing part 61 and the bearing part 66 by the spiral grooves 67 can be transmitted to an incompressible fluid contained in the hermetically sealed cavity 65 to provide the force to deform the wall 61.

Figure 8:
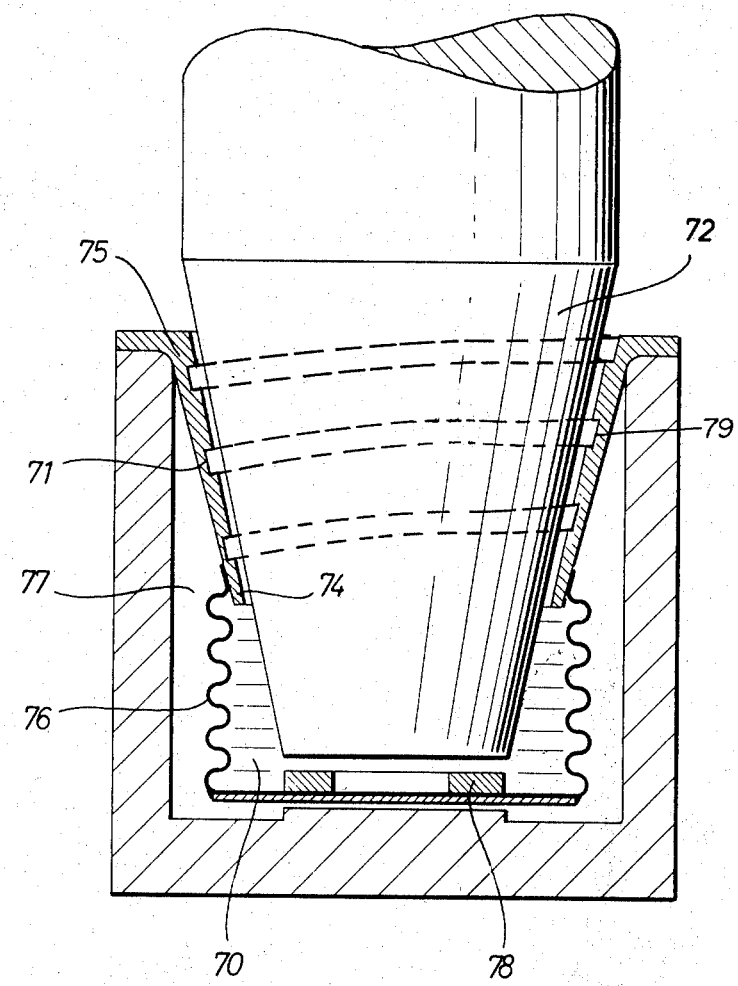
FIG. 8 illustrates diagrammatically a cross-section through a bearing according to the invention having conical sliding surfaces.

FIG. 8 shows diagrammatically a conical bearing assembly which comprises a bearing journal 72 and a bearing sleeve 71 having a deformable surface. The bearing sleeve has a wall in the region of the small diameter 74 which is thicker than the wall in the peripheral region 75. A bellows 76 acts to transmit the excess pressure generated by the spiral grooves 79 in the space 70 to an incompressible fluid hermetically sealed in the space 77. The bearing journal 72 rests at standstill on the sliding ring 78 while during rotation it lifts owing to a small expansion of the bellows.

Figure 9:
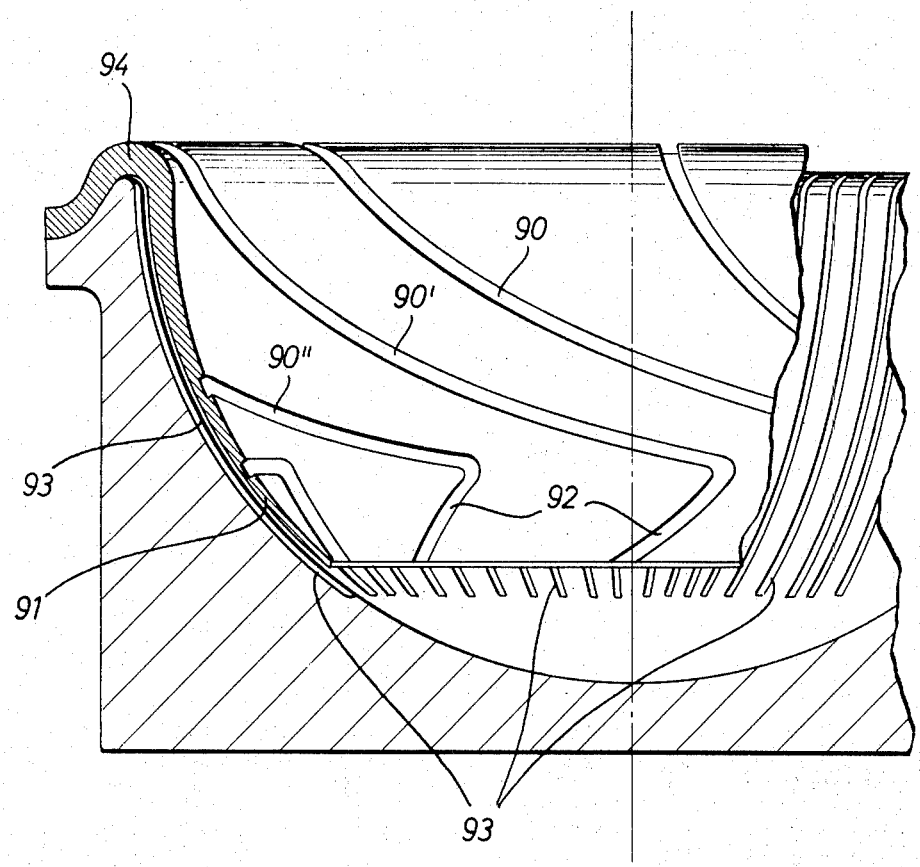
FIG. 9 illustrates diagrammatically a sectional view of the concave bearing element of a spiral groove bearing according to the invention.

FIG. 9 illustrates a portion of a bearing assembly wherein a concave bearing element includes a spherical bearing cup to provide the deformable surface. Flat grooves 90, 90' and 90'' are included and extend from the outer periphery of the cup down towards the center thereof to the region 92 where the direction of the grooves are reversed to extend in an opposite direction to the bottom of the cup. This construction results in a bearing assembly capable of taking higher radial loads than if only purely spiral grooves were used. A small quantity of lubricant may penetrate behind the cup 91 through narrow slots 93 which extend along meridians such that hydrodynamic pressure generated by the grooves will be transmitted to the back side of the cup to press it against the convex spherical bearing element, not shown. The cup is elastically deformable about the bead 94 so that the cup may be pressed towards the convex element.

We claim:

1. A bearing assembly comprising a first element having thereon a load carrying surface of revolution and a second element having thereon a load carrying elastically deformable surface of revolution with said surfaces being disposed opposite to each other to form a bearing clearance therebetween adapted to be filled with a fluid lubricant; the improvement comprising having grooves on one of said surfaces extending radially inwardly to generate a hydrodynamic pressure in the bearing clearance which pressure increases from the radial outer portion of the bearing clearance towards the center thereof, having a cavity in said second element with said surface forming a wall of said cavity, and in having pressure transmitting means for transmitting hydrodynamic pressure from the region of highest hydrodynamic pressure generated by said grooves to said deformable surface whereby the deformable surface may be urged towards the load carrying surface of said first element.

2. A bearing assembly according to claim 1 the improvement further comprising in that the wall thickness of said deformable surface decreases from the radial outer portion thereof towards the center thereof.

3. A bearing assembly according to claim 1 the improvement further comprising in that said deformable surface is in the form of a spherical cup and wherein said pressure transmitting means comprises at least one aperture in said deformable wall through which pressure in said clearance is transmitted to said cavity.

4. A bearing assembly according to claim 1 the improvement further comprising in that said cavity contains an elastomeric core and said deformable body comprises a thin wall shell.

5. A bearing assembly according to claim 1 the improvement further comprising in that said cavity forms a part of a hermetic chamber and in having an incompressible material filling said chamber.

6. A bearing assembly according to claim 5 wherein sad incompressible material comprises a metal which melts at the operating temperature of the bearing.

7. A bearing assembly according to claim 1 the improvement further comprising in that the deformable surface is in the form of a spherical cup having a recess in the center portion thereof.

8. A bearing assembly according to claim 7 wherein the pressure transmitting means comprises a corrugated portion of the deformable wall which is contained in said recess.

9. A bearing assembly according to claim 1 wherein said grooves are in spiral form and having connecting means on the outer diameter of said deformable surface connecting said grooves.

10. A bearing assembly according to claim 9 having in addition a sealing ring attached to one bearing element and overlying the said connecting means to prevent ingress of dirt into said bearing clearance and grooves.

11. A bearing assembly according to claim 10 the improvement further comprising in that said deformable wall is concave shaped, in that said second bearing element is concave shaped, and wherein said deformable wall and element are sealed to each other at their outer peripheries.

12. A bearing assembly according to claim 1 the improvement comprising in addition in that one said surface has spiral lands thereon comprising a material having favorable sliding properties.

13. A bearing assembly according to claim 12 wherein said material comprises a metal film having particles of extreme hardness embedded therein.

14. A bearing assembly according to claim 13 the improvement further comprising in that the first bearing element has a ring thereon of a hard material having favorable sliding properties adapted to contact said lands during start-up and stopping phases.

* * * * *